(12) United States Patent
Asaka et al.

(10) Patent No.: US 10,788,307 B2
(45) Date of Patent: Sep. 29, 2020

(54) DEFORMATION SENSOR COMPRISING AN ION-CONDUCTIVE POLYMER LAYER

(71) Applicants: NATIONAL INSTITUTE OF ADVANCED INDUSTRIAL SCIENCE AND TECHNOLOGY, Tokyo (JP); MITSUI CHEMICALS TOHCELLO, INC., Tokyo (JP)

(72) Inventors: Kinji Asaka, Ikeda (JP); Tetsuya Horiuchi, Ikeda (JP); Zicai Zhu, Ikeda (JP); Mitsuo Takase, Tokyo (JP)

(73) Assignees: NATIONAL INSTITUTE OF ADVANCED INDUSTRIAL SCIENCE AND TECHNOLOGY, Tokyo (JP); MITSUI CHEMICALS TOHCELLO, INC., Tokyo (JP)

(*) Notice: Subject to any disclaimer, the term of this patent is extended or adjusted under 35 U.S.C. 154(b) by 0 days.

(21) Appl. No.: 16/064,121

(22) PCT Filed: Dec. 22, 2016

(86) PCT No.: PCT/JP2016/088351
§ 371 (c)(1),
(2) Date: Jun. 20, 2018

(87) PCT Pub. No.: WO2017/111004
PCT Pub. Date: Jun. 29, 2017

(65) Prior Publication Data
US 2019/0003818 A1    Jan. 3, 2019

(30) Foreign Application Priority Data
Dec. 25, 2015 (JP) .................... 2015-253911

(51) Int. Cl.
*G01L 1/00*     (2006.01)
*G01B 7/16*     (2006.01)
(Continued)

(52) U.S. Cl.
CPC ............... *G01B 7/16* (2013.01); *G01B 5/30* (2013.01); *G01D 5/14* (2013.01); *G01L 1/04* (2013.01);
(Continued)

(58) Field of Classification Search
CPC . G01B 7/16; G01B 25/30; G01D 5/14; H01B 1/24; C08K 3/041; B82B 1/00
(Continued)

(56) References Cited

U.S. PATENT DOCUMENTS 5,672,937 A * 9/1997 Choi ................... H01B 1/20
                                                  313/503
8,669,755 B2 * 3/2014 Kato ................... G01B 7/287
                                                  204/406

(Continued)

FOREIGN PATENT DOCUMENTS

CN    101061399 A    10/2007
JP    H03-081909 A   4/1991
(Continued)

OTHER PUBLICATIONS

Japanese Patent Office, International Search Report in International Patent Application No. PCT/JP2016/088351 (dated Mar. 14, 2017).
(Continued)

*Primary Examiner* — Max H Noori
(74) *Attorney, Agent, or Firm* — Leydig, Voit & Mayer, Ltd.

(57) ABSTRACT

The invention provides a sensor capable of detecting deformation. The deformation sensor has a structure in which an ion-conductive polymer layer is sandwiched between soft electrodes, wherein non-uniform ion distribution is generated in the ion-conductive polymer layer by deformation, thereby generating a potential difference between the electrodes.

20 Claims, 13 Drawing Sheets

(51) Int. Cl.
*G01D 5/14* (2006.01)
*G01L 1/04* (2006.01)
*G01L 1/14* (2006.01)
*G01L 1/16* (2006.01)
*G01L 1/06* (2006.01)
*G01L 5/00* (2006.01)
*G01B 5/30* (2006.01)
*H01B 1/24* (2006.01)
*C08K 3/04* (2006.01)
*B82B 1/00* (2006.01)

(52) U.S. Cl.
CPC .................. *G01L 1/06* (2013.01); *G01L 1/14* (2013.01); *G01L 1/16* (2013.01); *G01L 5/0057* (2013.01); *H01B 1/24* (2013.01); *B82B 1/00* (2013.01); *C08K 3/041* (2017.05)

(58) Field of Classification Search
USPC .......................................................... 73/774
See application file for complete search history.

(56) References Cited

U.S. PATENT DOCUMENTS

| | | | |
|---|---|---|---|
| 2003/0034534 A1 | 2/2003 | Thakur | |
| 2009/0115286 A1 | 5/2009 | Asaka et al. | |
| 2010/0288635 A1 | 11/2010 | Komiya et al. | |
| 2012/0025803 A1 | 2/2012 | Kato et al. | |
| 2012/0293491 A1* | 11/2012 | Wang | G06F 3/044 |
| | | | 345/419 |
| 2015/0281531 A1 | 10/2015 | Kato et al. | |
| 2015/0285698 A1* | 10/2015 | Matsumoto | G01L 5/228 |
| | | | 73/862.046 |
| 2015/0346872 A1* | 12/2015 | Hwang | G06F 3/041 |
| | | | 345/174 |

FOREIGN PATENT DOCUMENTS

| | | |
|---|---|---|
| JP | H06-223838 A | 8/1994 |
| JP | 2005-039995 A | 2/2005 |
| JP | 2006-172722 A | 6/2006 |
| JP | 2007-096049 A | 4/2007 |
| JP | 2007-128280 A | 5/2007 |
| JP | 2008-099551 A | 4/2008 |
| JP | 2008-153026 A | 7/2008 |
| JP | 2009-033944 A | 2/2009 |
| JP | 2010-097794 A | 4/2010 |
| JP | 2010-160952 A | 7/2010 |
| JP | 2012-032325 A | 2/2012 |
| JP | 2014-201800 A | 10/2014 |
| WO | WO 2010/095581 A1 | 8/2010 |

OTHER PUBLICATIONS

China National Intellectual Property Administration, The First Office Action in Chinese Patent Application No. 201680071436.7 (dated Aug. 30, 2019).

European Patent Office, Extended European Search Report in European Patent Application No. 16878891.7 (dated Jul. 25, 2019).

* cited by examiner

DEFORMATION SENSOR COMPRISING AN ION-CONDUCTIVE POLYMER LAYER

CROSS-REFERENCE TO RELATED APPLICATIONS

This patent application is the U.S. national phase of International Patent Application No. PCT/JP2016/088351, filed Dec. 22, 2016, which claims the benefit of Japanese Patent Application No. 2015-253911, filed on Dec. 25, 2015, which are incorporated by reference in their entireties herein.

TECHNICAL FIELD

The present invention relates to a flexible deformation sensor capable of detecting deformation.

BACKGROUND ART

Research of ion polymer-based actuators, such as ion-conductive polymer actuators, conductive polymer actuators, or carbon nanotube actuators, has actively been conducted as research of a low-voltage-driving (several V or less) soft actuator (Patent Documents 1 to 3). These actuators are structured such that two or more electrode layers are joined together via at least one ion-conductive layer serving as an insulating layer. By applying a voltage between the electrodes, the basic three-layer structure flexes and serves as an actuator.

In Patent Document 4, a ferromagnetic layer is formed from cobalt, nickel, or the like, on a solid polymer ion-exchange membrane by plating so as to cause displacement of an actuator by a magnetic field.

CITATION LIST

Patent Documents

Patent Document 1: JP2010-160952A
Patent Document 2: JP2010-97794A
Patent Document 3: JP2009-33944A
Patent Document 4: JP2008-99551A

SUMMARY OF INVENTION

Technical Problem

An object of the present invention is to provide a lightweight and inexpensive deformation sensor.

Solution to Problem

The present invention provides the following deformation sensors.
Item 1: A deformation sensor comprising a structure in which an ion-conductive polymer layer is sandwiched between soft electrodes, wherein non-uniform ion distribution is generated in the ion-conductive polymer layer by deformation, thereby generating a potential difference between the electrodes.
Item 2: The deformation sensor according to Item 1, wherein an electrode material of the electrodes is a transparent conductive substrate or a metal foil.
Item 3: The deformation sensor according to Item 1, wherein the electrodes are plastic electrodes.
Item 4: The deformation sensor according to Item 3, wherein the plastic electrodes are vapor-nonpermeable.
Item 5: The deformation sensor according to any one of Items 1 to 4, wherein:
the plastic electrodes each comprise a plastic layer and a conductive film, and the deformation sensor is structured such that the ion-conductive polymer layer is sandwiched between the conductive films; and
the conductive film is selected from the group consisting of inorganic semiconductors, conductive polymers, metal mesh, and laminates of nanocarbon thin films.
Item 6: The deformation sensor according to Item 5, wherein the conductive film is an ITO film.
Item 7: The deformation sensor according to any one of Items 1 to 6, wherein the ion-conductive polymer comprises an ion-exchange resin.
Item 8: The deformation sensor according to any one of Items 1 to 6, wherein the ion-conductive polymer comprises a polymer complex gel.

Advantageous Effects of Invention

The present invention provides a soft, lightweight, inexpensive, and disposable deformation sensor.

The deformation sensor of the present invention detects a potential difference generated between the electrode films due to non-uniform distribution of ions in an ion-conductive polymer layer, which is caused by deformation. A preferred embodiment of the present invention is structured such that an ion-conductive polymer layer is sandwiched between plastic electrodes, unlike the previously known plated electrode or the like. This structure ensures flexibility and light weight and enables ions and a solvent, such as water, to be sealed in the ion-conductive polymer, while preventing the influence of moisture in ambient air or the like. The deformation sensor of the present invention is applicable to a wide range of fields, including touch sensors of smartphones or wearable electronics, security use in which the deformation sensor is embedded in or adhered to a window glass, and a pressure distribution sensor for preventing bedsores in which the deformation sensor is woven into a bed or sheets.

BRIEF DESCRIPTION OF DRAWINGS

FIG. 1A: A block diagram of a sensor evaluation system
Controller APD-050FCA (Asahi Seisakusho): Vibration exciter controller for controlling a vibration exciter
Wavemaker SL-0505 (Asahi Seisakusho): Vibration exciter for imparting deforming vibration to a sensor film
IPMC sensor: Ion-conductive polymer sensor film of the present invention
Cont. T/H Chamber SH-222 (ESPEC Corp.): Temperature and humidity controlling chamber (not used in Examples, measurements in the Examples were performed at a temperature and humidity in the laboratory, i.e., at about 25° C. and about 60% humidity)
Displacement Sensor IL-030 (Keyence Corporation) for measuring displacement of the sensor film to which displacement vibration is applied
I/V circuit: Homebuilt current measurement circuit (not used in Examples)
Voltage Amplifier: Homebuilt voltage amplifier circuit
Terminal Board, DAQ Board, Lab View Measurement System (National Instrument)

DESCRIPTION OF EMBODIMENTS

In this specification, examples of ion-conductive polymer include ion-exchange resins having a fluororesin skeleton or a hydrocarbon resin skeleton such as polyethylene, polypropylene or polystyrene; polymer complex gel; copolymers of cationic monomer and anionic monomer, and the like. Examples of ion-exchange resin include any of anion-exchange resins, cation-exchange resins, and amphoteric ion-exchange resins. Cation-exchange resins are preferable.

Preferable examples of cation-exchange resin include ion-conductive polymers having a structure in which an acid functional group, such as a sulfonate group or carboxyl group is introduced in a fluororesin skeleton or hydrocarbon resin skeleton. Cation-exchange resins in which an acid functional group, such as a sulfonate group, carboxyl group, or the like is introduced in a fluororesin are preferable. Specific examples of cation-exchange resins include perfluoro sulfonic acid resin, such as a Nafion membrane (registered trademark; DuPont) or the like. Examples of the cation bonded to the sulfonate group or the carboxyl group include $H^+$, alkali metal ions such as $Na^+$, $K^+$, $Li^-$, and $NH4^+$.

Preferable examples of anion-exchange resin include ion-conductive polymers having a structure in which a basic functional group, such as a quaternary ammonium group (e.g., tetramethyl ammonium or tetraethyl ammonium) is introduced in a fluororesin skeleton or hydrocarbon resin skeleton. Anion-exchange resins in which a basic functional group, such as a quaternary ammonium group, is introduced in a fluororesin, are preferable. Examples of the anion to be bonded to the quaternary ammonium group include $OH^-$, halogen ions such as chlorine ion, nitrate ion, and the like.

Preferable examples of amphoteric ion-exchange resin include ion-conductive polymers having a structure in which an acid functional group, such as a sulfonate group, carboxyl group, or the like, and a basic functional group, such as a quaternary ammonium group, are introduced in a fluororesin skeleton or hydrocarbon resin skeleton. Amphoteric ion-exchange resins in which an acid functional group, such as a sulfonate group, or carboxyl group, and a basic functional group, such as a quaternary ammonium group, are introduced in a fluororesin are preferable. It is possible to use a combination of anion-exchange resin and cation-exchange resin.

Figure 8:
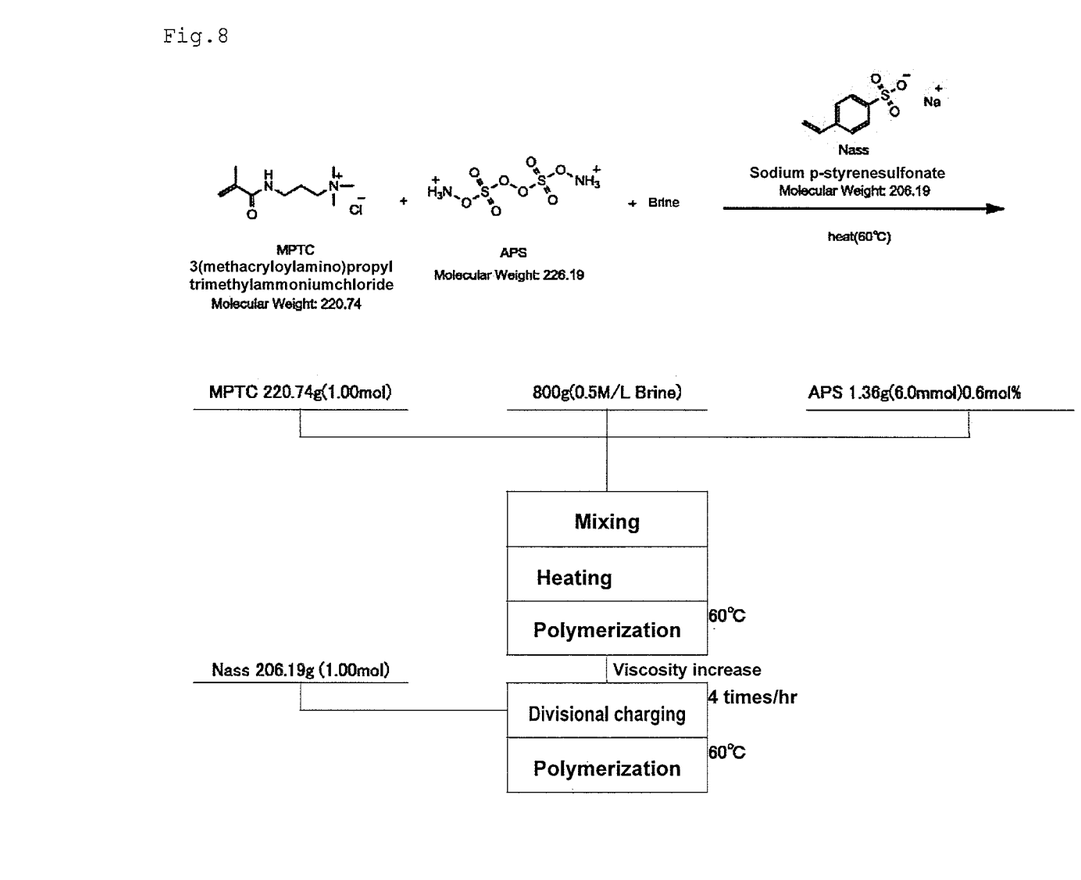
FIG. 8: An example of a synthesis scheme of a copolymer (MPNS) of a cationic monomer and an anionic monomer, wherein APS represents ammonium persulfate (ammonium peroxodisulfate) used as a heat polymerization catalyst.
Figure 9:
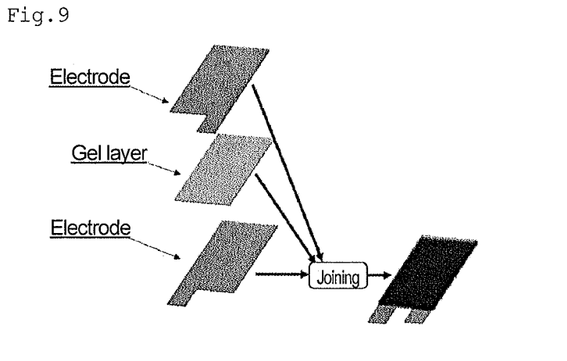
FIG. 9: A schematic diagram of a deformation sensor of the present invention

A polymer complex gel refers to a complex gel resulting from an electrostatical bond of a polycationic polymer and a polyanionic polymer, or a complex gel resulting from a bond of copolymers of cationic monomer and anionic monomer. The polycationic polymer and the polyanionic polymer may be mixed at an equivalent ratio of 1:1 to be neutral in charge, or one of them may have an excess quantity. Examples of the cationic group of the polycationic polymer include ammonium in which a proton is added to primary, secondary or tertiary amine, or quaternary ammonium. Examples of the anionic group of the polyanionic polymer include $SO_3^-$, $COO^-$, and the like. Examples of polycationic polymer include homopolymers and copolymers of basic amino acids, such as polylysine, polyarginine, polyhistidine, or a copolymer of lysine and arginine; basic polysaccharides, such as collagen, ionene, chitosan, or aminated cellulose; basic vinyl polymer, such as polyvinylamine, polyallylamine, polydivinylpyridine, or salts thereof (hydrochloride, nitric acid salt, sulfuric acid salt, etc.); polyimide, polyethylene imine, polyallylamine, and polydiallyldimethylammonium salt. The polyanionic polymer is not particularly limited insofar as it is an organic polymer having an anionic substituent in the polymer chain, and examples include anions of polycarboxylic acid, such as polyacrylic acid, polymethacrylic acid, polymaleic acid and polyaspartic acid; and anions of polysulfonic acid, such as polystyrene sulfonic acid and polyvinyl sulfonic acid. These polycarboxylic acids and polysulfonic acids may be copolymers of vinylcarboxylic acid or vinyl sulfonic acid and other polymerizable monomers (such as acrylic acid ester and styrene). In the copolymers of cationic monomer and anionic monomer, examples of cationic monomer include (acryloylamino)alkyl-N,N,N-trialkylammonium halide, (methacryloylamino)alkyl-N,N,N-trialkylammonium halide, vinyl-N,N,N-trialkylammonium halide, allyl-N,N,N-trialkylammonium halide, quaternized vinylimidazole and the like, and examples of anionic monomer include acrylic acid, methacrylic acid, maleic acid, vinyl sulfonic acid, styrene sulfonic acid, acrylamide propyl methanesulfonate, and the like. The molar ratio between the cationic monomer and the anionic monomer is preferably 2:8 to 8:2, more preferably 3:7 to 7:3, further preferably 4:6 to 6:4, and most preferably 5:5. Preferable examples of the copolymer of cationic monomer and anionic monomer include poly(3-(methacryloylamino)propyl trimethylammoniumchloride-p-sodium styrenesulfonate) copolymer (MPNS), poly(dimethylaminoethylacrylate benzylchloride-p-sodium styrenesulfonate) copolymer (DMNS), and the like. FIG. 8 shows the synthesis scheme of MPNS. FIG. 9 is a schematic diagram of a deformation sensor of the present invention.

The thickness of the ion-conductive polymer layer is about 25 to 500 μm.

The deformation sensor of the present invention may comprise two or more soft and flexible electrodes, preferably a pair of soft electrodes, to sandwich the ion-conductive polymer layer. Examples of the electrodes include metal flat plates, metal thin films (e.g. metal foil, such as SUS foil or aluminum foil), transparent electrodes (e.g., ITO film), nanocarbon thin film (e.g., carbon nanotube thin film), and plastic electrodes. The electrode material is preferably made of a transparent conductive substrate (e.g. film); however, for use in which transparency is not necessary, a metal flat plate, a metal thin film, and a nanocarbon thin film may be used. The electrodes using a transparent conductive substrate include plastic electrodes and transparent electrodes. When a metal flat plate, a metal thin film, a metal foil or the like is used as an electrode, a protective film may be provided by lamination.

The deformation sensor of the present invention may operate in the air, water, vacuum, and an organic solvent. Sealing may be applied to the deformation sensor as necessary according to the usage environment. Examples of the sealing material are not particularly limited, and include various resins and the like.

The electrode may be a flexible printed board in which wires are drawn by etching or the like. A printed board is useful in providing a plurality of sensors in a single substrate. Further, to prevent short circuiting due to the contact between electrodes, a non-conductive portion may be provided in a part of the electrode.

Figure 10:
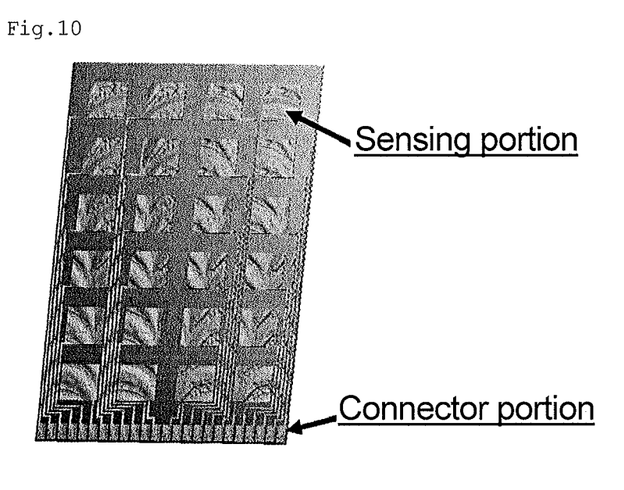
FIG. 10: A schematic diagram showing wires in the defamation sensor.
Figure 11:
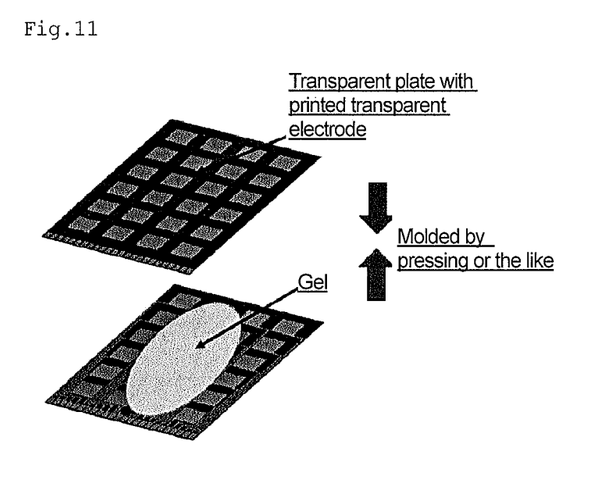
FIG. 11: A production method of a deformation sensor.

FIG. 10 shows a deformation sensor of the present invention having a plurality of sensing portions. The deformation sensor having many sensing portions may be obtained through three steps of: printing a transparent electrode pattern on a transparent plate, and cutting or treating with acid-base the surface of the transparent plate coated with the transparent electrode (step 1); preparing two or more transparent electrodes having pattern electrodes, and sandwiching an ion-conductive polymer between these electrodes (step 2) (FIG. 11); and providing wires on the transparent electrodes to enable it to serve as a deformation sensor (step 3). Each sensing portion is preferably transparent.

Examples of a plastic electrode include a lamination of a plastic layer and a conductive film.

Examples of plastic include acrylic resins, such as polymethyl methacrylate (PMMA), or polymethyl acrylate (PMA); and transparent plastic, such as polyethylene (PE), polypropylene (PP), polyethylene terephthalate (PET), polyethylene-2,6-naphthalate, polypropylene terephthalate, nylon 6, nylon 4, nylon 66, nylon 12, polyimide, polyamide-imide, polyether sulfone, polyether ether ketone, polycarbonate, polyethylene naphthalate (PEN), polyethylene butyrate, polyarylate, triacetyl cellulose, cellulose propionate, polyvinyl chloride, polyvinylidene chloride, polyvinyl alcohol, polyether imide, polyphenylene sulfide, polyphenylene oxide, polystyrene, syndiotactic polystyrene, norbornene polymer, cycloolefin polymer (COP) or cycloolefin copolymer (COC). Films, sheets, and the like of these plastic may be used as the plastic layer.

Examples of conductive films include inorganic semiconductor films, conductive polymer films, metal mesh, and nanocarbon thin film laminations. The conductive film is preferably transparent. Further, when the conductive film is an inorganic semiconductor film, evaporation of water, or an organic solvent such as carbonate (ethylene carbonate, propylene carbonate, or the like) contained in the ion-conductive polymer layer may be suppressed (vapor-nonpermeable or organic solvent nonpermeable), and also the influence of vapor in the air may be suppressed.

Examples of inorganic semiconductors include one, or two or more kinds of oxides of titanium, tin, zinc, tungsten, zirconium, gallium, indium, yttrium, niobium, tantalum, vanadium and the like (including complex oxides), preferably tin oxide, indium oxide, zinc oxide, and like metal oxide semiconductors, laminated conductive films obtained by lamination of silver thin films or gold thin films with a high refractive dielectric, tin-doped indium oxide (ITO), fluorine-doped tin oxide (FTO), and the like.

Examples of conductive polymer include polythiophene-based polymers, polyacetylene-based polymers, polyparaphenylene-based polymers, polyaniline-based polymers, polyparaphenylene-vinylene-based polymers, polypyrrole-based polymers, and the like. Examples of preferable transparent conductive polymer include so-called PEDOT/PSS, PEDOT/PVS, PEDOT/TsO, and the like, which are poly(3, 4-ethylenedioxythiophene) (PEDOT) doped with polystyrene sulfonic acid (PSS), polyvinyl sulfonic acid (PVS), or p-toluenesulfonic acid (TsO).

Examples of metal to be used for the metal mesh include platinum, gold, silver, nickel and the like. Silver and nickel are economically preferable, and silver is most preferable because of its excellent conductivity.

Examples of nanocarbon thin film include thin films, such as carbon nanotube, carbon nanohorn, carbon nanofiber, or graphite nanocrystal. Examples include those obtained by lamination of two or more of these thin films.

The conductive film is preferably transparent. Examples of preferable transparent conductive films include those having a surface resistance of $100\Omega/\square$ or less and a vapor barrier property. A preferable material is a three-layer structure (ITO/Ag/ITO) and five-layer structure (ITO/Ag/ITO/Ag/ITO) in which one or more silver thin films are sandwiched by ITO films or the like. A multilayer structure is preferable to obtain high visible light transmittance and low surface resistance. Examples of usable products include transparent conductive films Altair-M-5, 10, 20 and the like that were sold by Mitsui Chemicals, Inc., and TCO film and the like that were used as plasma display EMI shield filters.

A lamination structure of a transparent barrier film and a conductive film made of a metal mesh of silver or copper may also be used. A silica film, a SiON film, and the like may be used as the transparent barrier film.

The electrode, such as the plastic electrode, is structured such that each electrode is attached to a lead wire so as to retrieve sensor signals.

The thickness of the plastic layer is about 12 to 200 μm, and the thickness of the conductive film is about 0.03 to 3 μm.

Examples of the deformation that generates non-uniform ion distribution in the ion-conductive polymer layer include flexion, twisting, breakage, pressing, indentation, folding, and the like.

The ion-conductive polymer layer and the electrodes may be joined by pressure-bonding, hot pressing, or the like, or may be bonded with an adhesive. They may also be adhered using a double adhesive tape or may be fixed by a bolt and a nut.

EXAMPLES

Hereinbelow, the present invention is more specifically described with reference to Examples.

Measurement Method

Figure 1A:
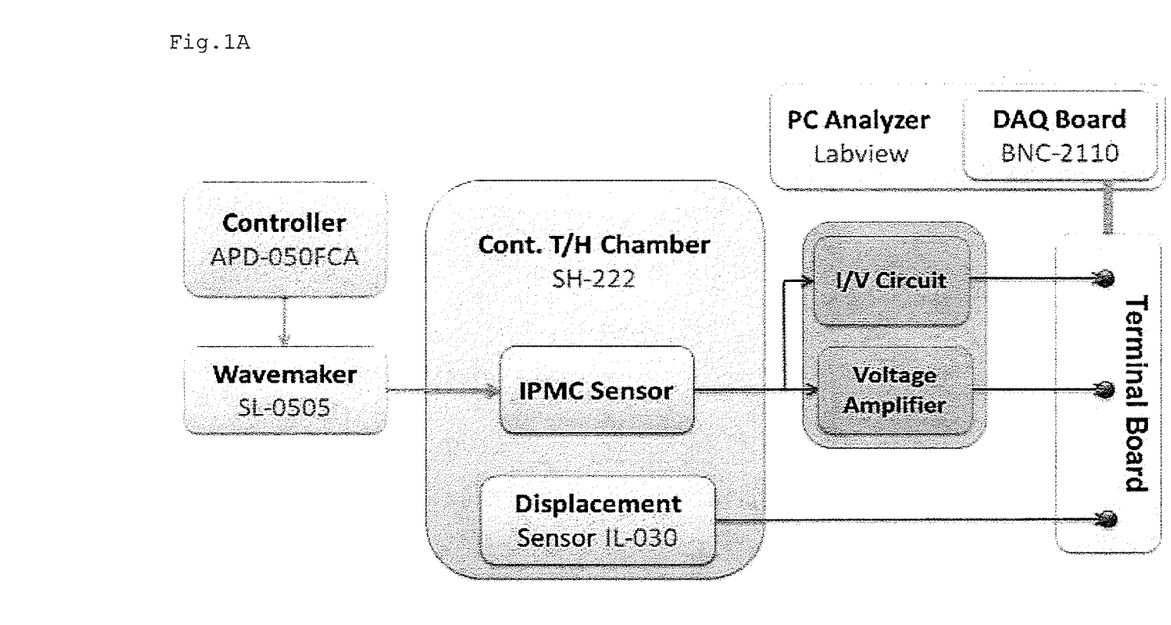
Figure 1B:
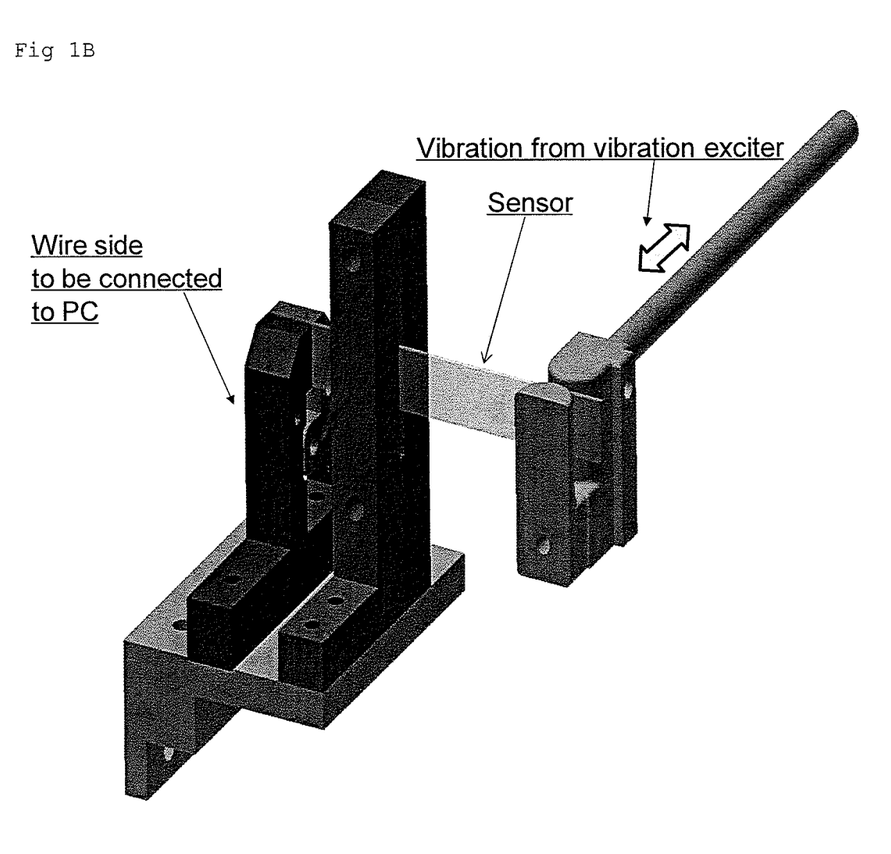
FIG. 1B: A schematic diagram showing the defamation sensor of the present invention attached to a sensor film holder (jig for fixing a sensor film and adding displacement vibration from a vibration exciter).
Figure 2:
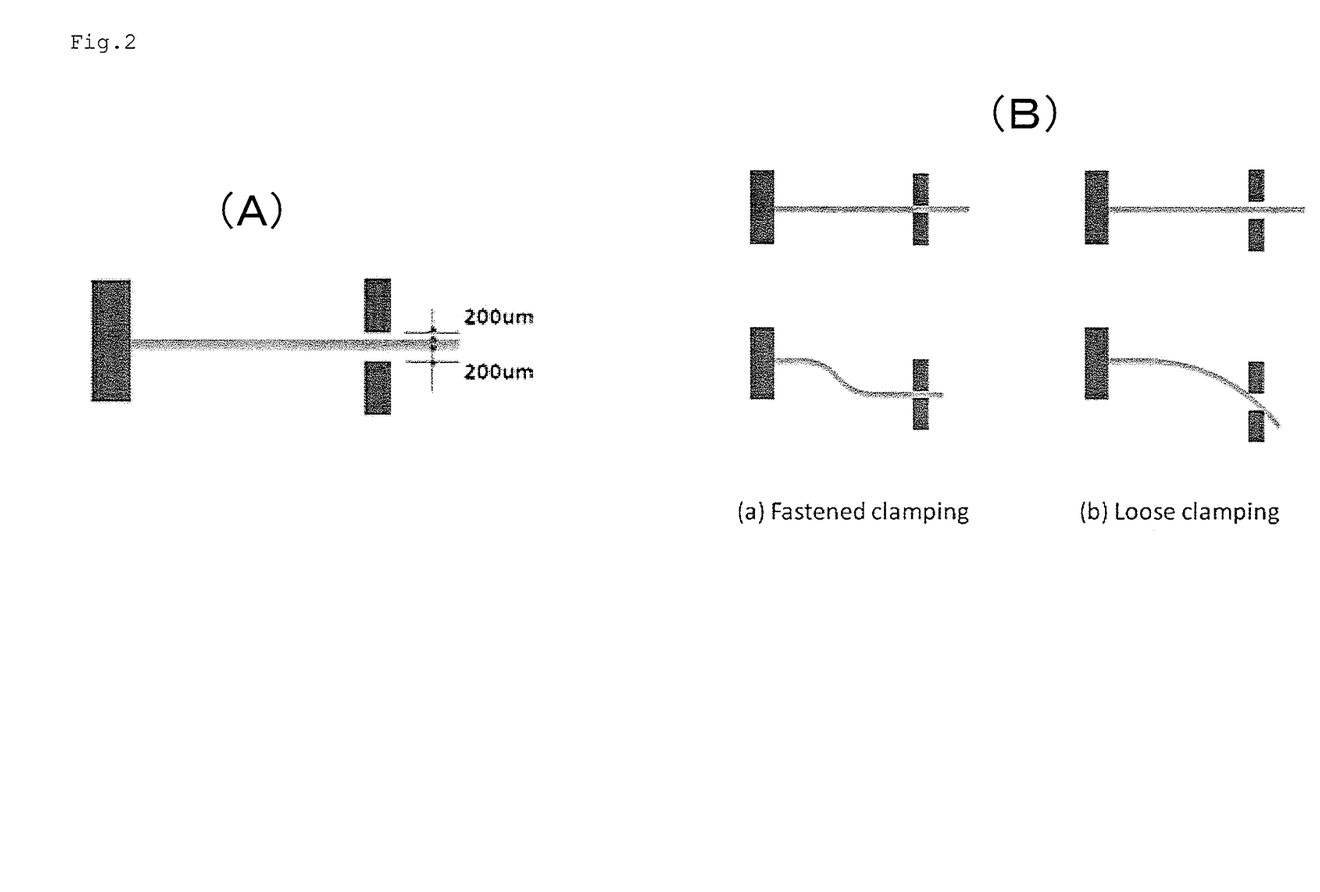
FIG. 2: A diagram of sensor films
(A) A schematic diagram in which a sensor film is fixed by a holder.
(B) (a) A schematic diagram in which displacement is given to a sensor film (1) fastened by a holder (2).
(B) (b) A schematic diagram in which displacement is given to a sensor film loosely clamped by a holder.

The measurement of the sensor characteristics was performed using the measurement system shown in FIG. 1(A). A sensor film (deformation sensor) was fixedly set in an electrode in a chamber, and fixed as shown in FIGS. 2(B)(a) and (B)(b) by the holder shown in FIG. 1(B) connected to a vibration exciter. Vibration was applied from the vibration exciter, and the generated voltage signals were measured. In the Examples, the Cont. T/H Chamber SH-222 (ESPEC Corp.) was not used, and the measurement was performed under the temperature and humidity in the laboratory (about 25° C., and about 60% humidity). An I/V circuit (homebuilt current measurement circuit) was not used in the Examples.

Example 1

Sensor Voltage Characteristics of a Joined Body Obtained by Electroless Gold Plating of Nafion A gold electrode was produced by electroless plating using the following DuPont Nafion 117 film (charge density=0.91 mequiv./g, dry thickness=175 μm) (N117).

$X = SO_3^-$ :Nafion®

The electroless plating was performed according to the method of Japanese Patent No. 2961125. The N117 film was immersed in an aqueous solution of a gold chloride phenanthroline complex ($[Au(phen)Cl_2]^+$) to adsorb the complex ions, followed by reduction in a sodium sulfite aqueous solution, thereby bonding a gold electrode. This process was repeated five times as plating, followed by immersion in 0.1M NaOH at least an entire day and night to convert the counter ions to Na, and stored in purified water. The peripheral portion of the gold electroless-plated thin film was cut off, thereby obtaining the deformation sensor of the present invention.

Figure 3:
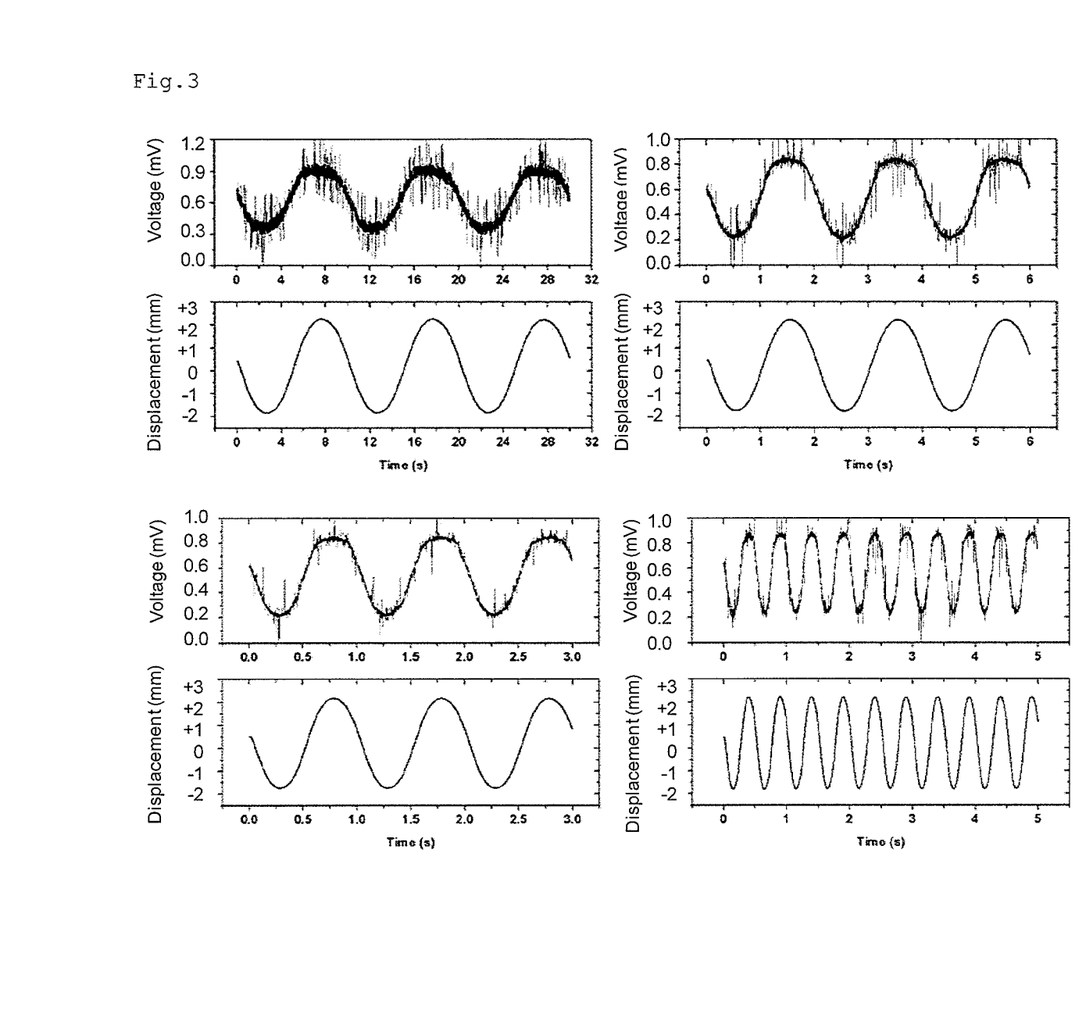
FIG. 3: Sensor signals in Example 1

FIG. 3 shows sensor signals when displacement of ±2 mm at a frequency of 0.1 Hz to 2 Hz was applied to the deformation sensor of the present invention obtained by the gold plating of N117. Voltage signals of about 1 mVp-p were observed.

Example 2

Sensor Voltage Characteristics of Nafion/ITO Film Joined Body

Figure 4:
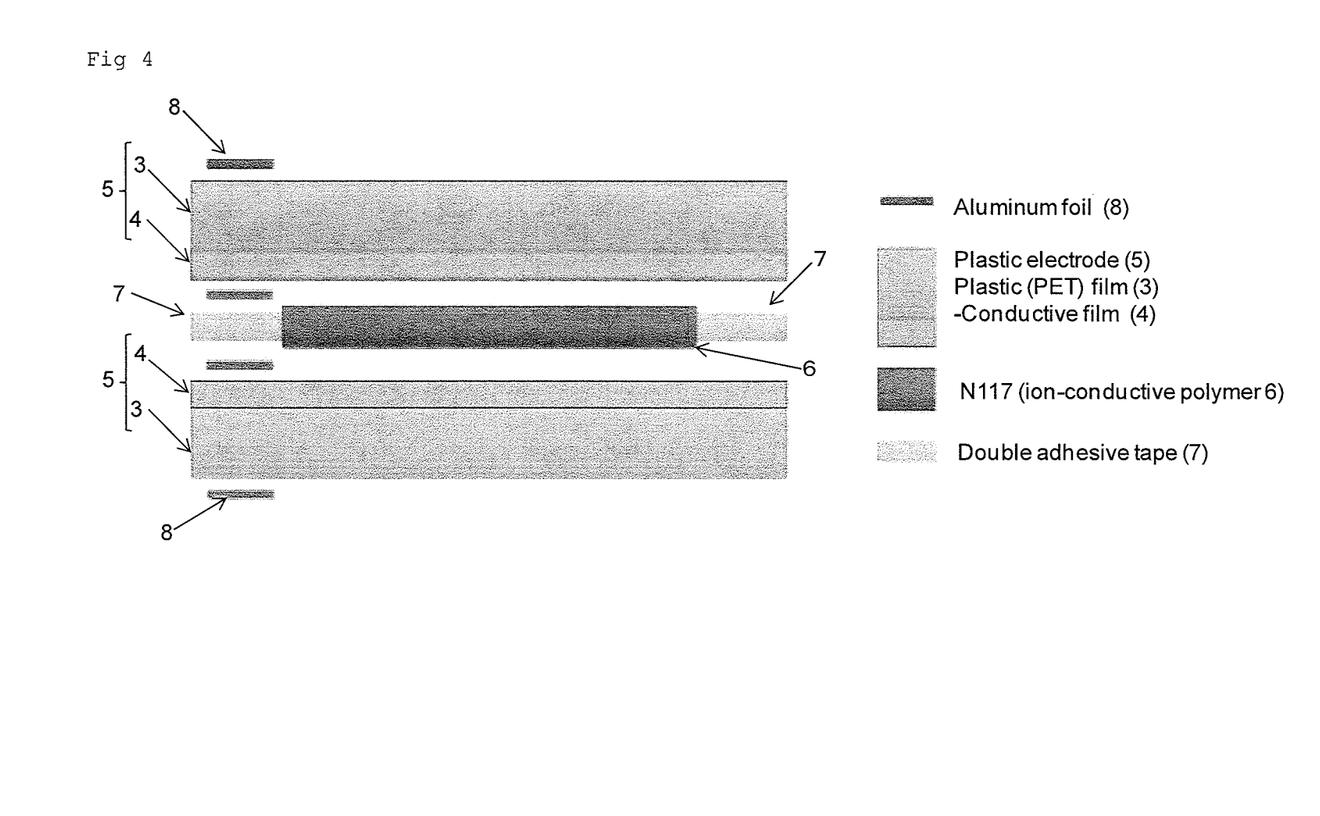
FIG. 4: A structure of a deformation sensor produced in Example 2.

Two plastic electrodes, each of which is a lamination of a PET film (plastic film) and an ITO film (conductive film) (surface resistance: 10Ω/□, ITO/Ag/ITO, or ITO/Ag/ITO/Ag/ITO, Mitsui Chemicals, Inc.), and a Nafion N117 film were adhered using a double adhesive tape so that the electrodes were adhered to both sides of the N117 film (FIG. 4). As in Example 1, an N117 film stored by being immersed in purified water with the counter ions converted to sodium was used. After the N117 film (5 mm×30 mm) was removed from the purified water, and the water on the surface was wiped, a 5 mm×30 mm hole was made on a 45 mm×15 mm double adhesive tape. The N117 film was placed in the hole, and the ITO films of the plastic electrodes were adhered to both sides of the double adhesive tape. In this step, the ITO film (conductive film) side of each plastic electrode comes in contact with the N117 film, so that the conductive films were sufficiently bonded with the N117 film. Further, an aluminum foil was used to retrieve the lead wire from the ITO film, as shown in FIG. 4.

Figure 5:
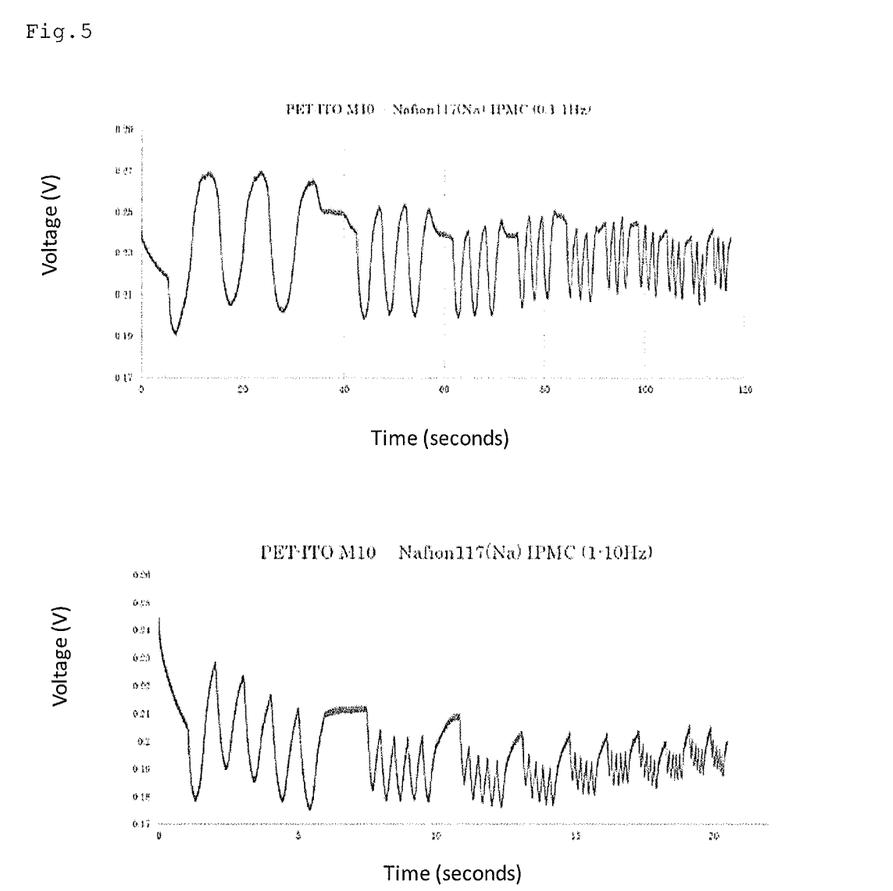
FIG. 5: Sensor signals of a deformation sensor obtained in Example 2.

FIG. 5 shows sensor signals when vibration with a displacement of ±2 mm at a frequency of 0.1 Hz to 10 Hz was applied, as in Example 1. Although the cause is currently unknown, sensor signals of about 80 mVp-p at maximum, which is greater than that in Example 1, were obtained.

Example 3

Figure 6:
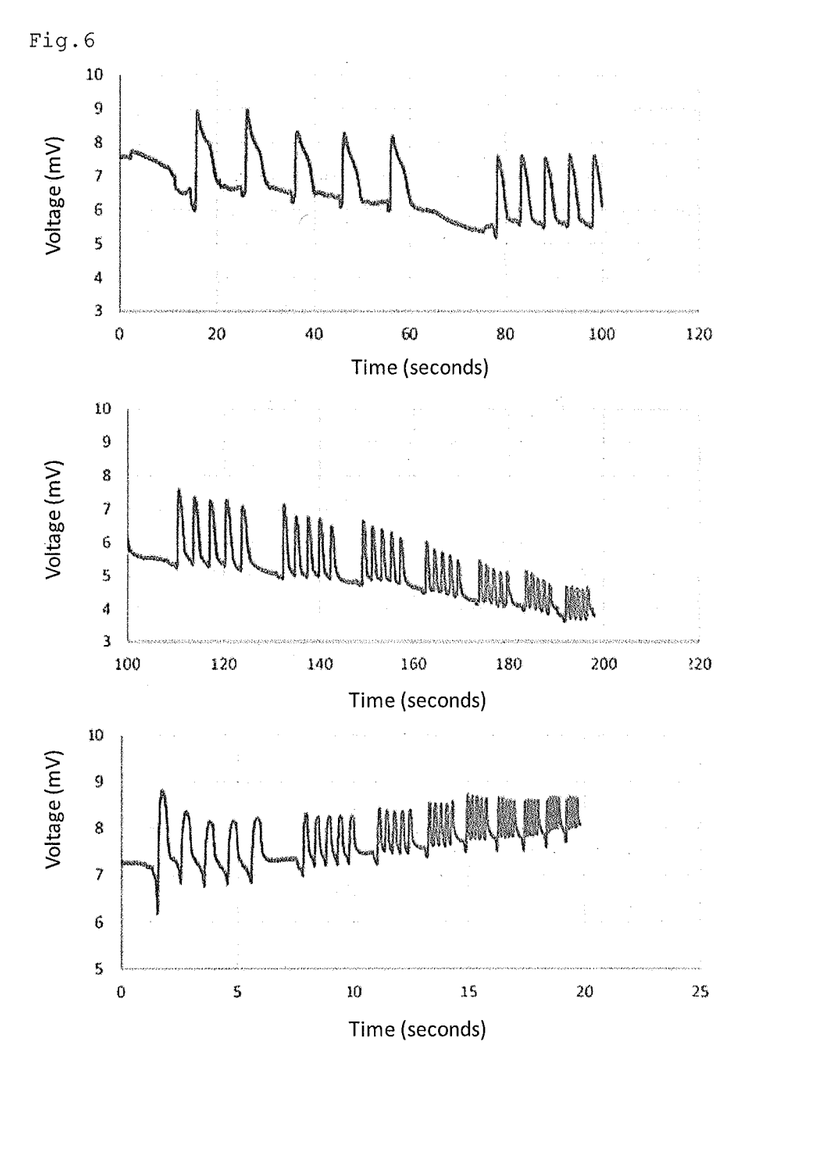
FIG. 6: Sensor signals of a deformation sensor obtained in Example 3.

Sensor Voltage Characteristics of Joined Body of Plastic Electrode/Nafion Thin Film/Plastic Electrode A Nafion dispersion solution (DE1020 (Wako Pure Chemical Ind. Ltd.), Nafion 10 wt %, water 90 wt %) was applied to an ITO film (15 mm×44 mm) (surface resistance=30Ω/□) of the plastic electrode constituted of an ITO film and a PET film, and the ITO film side of another plastic electrode (PET film/ITO film) of the same size was overlapped with the Nafion dispersion layer. Hot pressing was performed at 70° C. and 200 N for 3.5 hours, thereby producing a joined body ((PET film/ITO film)-(Nafion thin film)-(ITO film/PET film)), which was then immersed in purified water at least an entire day and night. Thereafter, the sensor characteristics of the joined body were measured under the same conditions as those of Example 1. In this case, the counter ions were hydrogen ions. FIG. 6 shows the measurement results. Signals of 2 mVp-p to 3 mVp-p were obtained.

Example 4

Figure 7:
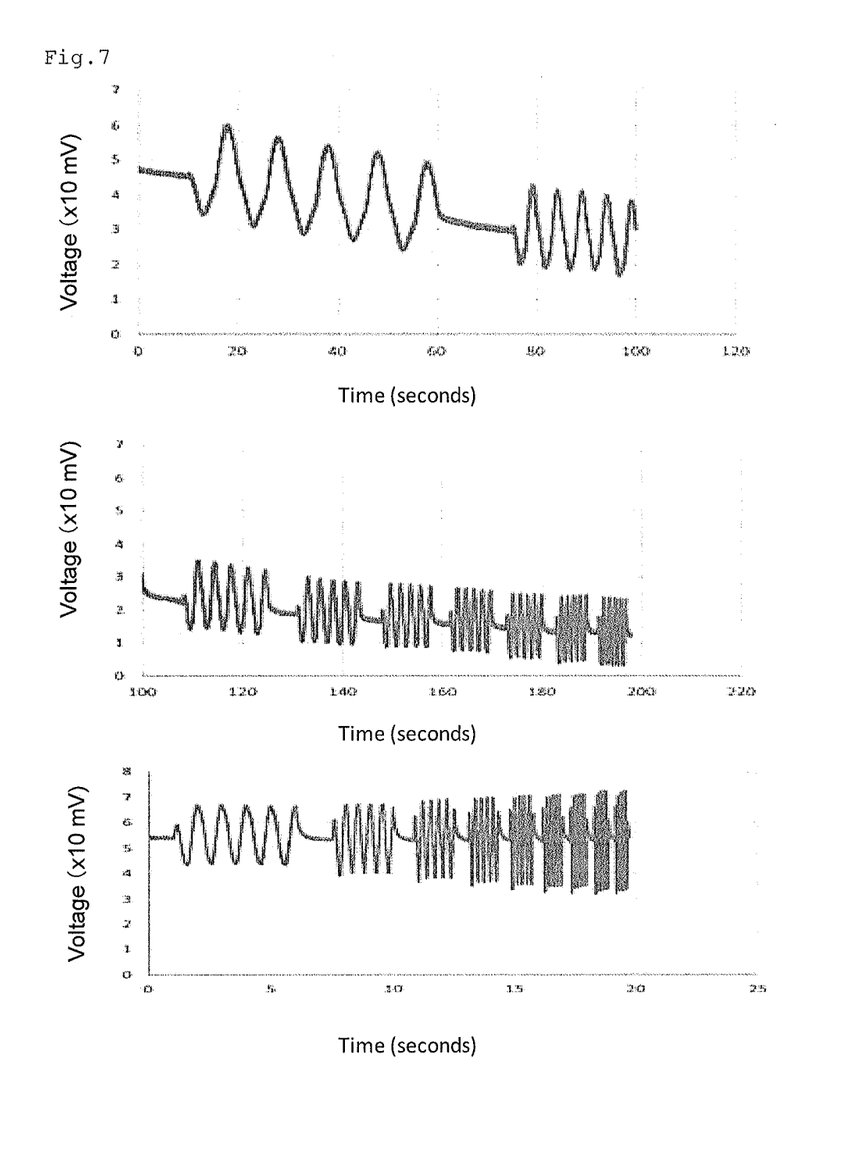
FIG. 7: Sensor signals of a deformation sensor obtained in Example 4.

Sensor Voltage Characteristics of Joined Body of Plastic Electrode/Polymer Complex Gel Film/Plastic Electrode Two plastic electrodes (PET film/ITO film) used in Example 3 were overlapped respectively with both sides of a polymer complex gel (MPNS, Mitsui Chemicals, Inc.) (a gel made of a copolymer of 3(methacryloylamino)propyltrimethylammoniumchloride as a cationic monomer, and sodium p-styrenesulfonate as an anionic monomer) film so that the polymer complex gel film is sandwiched by the ITO films of the electrodes. Hot pressing (normal temperature, 500 N, 30 minutes) was performed using a press, thereby producing a joined body ((PET film/ITO film)-(polymer complex gel film)-(ITO film/PET film)). The sensor characteristics of this joined body were measured under the same conditions as those of Example 2. In this case, the counter ions were sodium ions and chlorine ions. FIG. 7 shows the measurement results. Signals of 0.2 mVp-p to 0.4 mVp.p were obtained.

Example 5

Two 10-mm×40-mm stainless-steel plates having a thickness of 0.2 mm and an ion-conductive gel (MPNS-Na, MPNS-Li, DMNS-Na, or DMNS-Li) were used. The two stainless-steel plates were placed so that the gel was sandwiched between them, followed by pressure-bonding using a pressing device, thereby obtaining a deformation sensor. The pressing was performed at a pressure of 500 N for 3 hours. The pressure-bonded joined body was laminated with a protective film.

Figure 12:
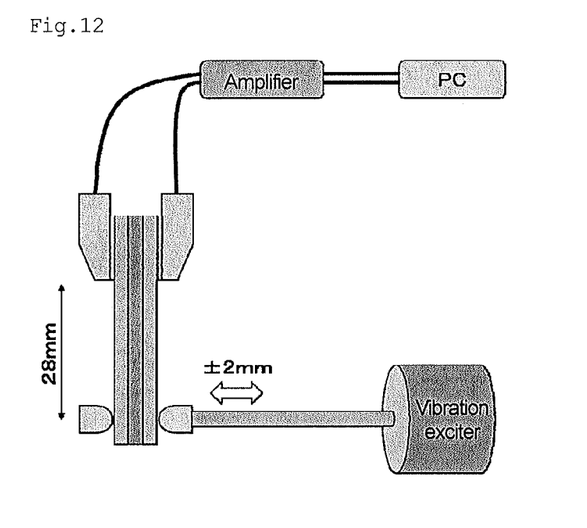
FIG. 12: A method for measuring the deformation amount of a deformation sensor of the present invention.

Wires were provided in each of the two stainless-steel plates in the deformation sensor. The wires were connected to an amplifier, and the amplified sensor signals were measured in a Labview environment (FIG. 12). In the measurement, the amplification rate is preferably 10^4 or more in voltage measurement, and preferably 10^6 or more in current measurement.

One end of the sensor was connected to a vibration exciter. The displacement of the vibration exciter is converted to the curvature of the sensor, and a signal corresponding to the curvature is outputted. Vibration with an amplitude of 2 mm at a frequency of 0.1 to 10 Hz was applied in a portion 28 mm from the sensor clamp portion. The following four kinds of gel were used.

High Tg gel Na ion (MPNS-Na)
High Tg gel Li-substituted (MPNS-Li)
Low Tg gel Na ion (DMNS-Na)
Low Tg gel Li-substituted (DMNS-Li)

Figure 13:
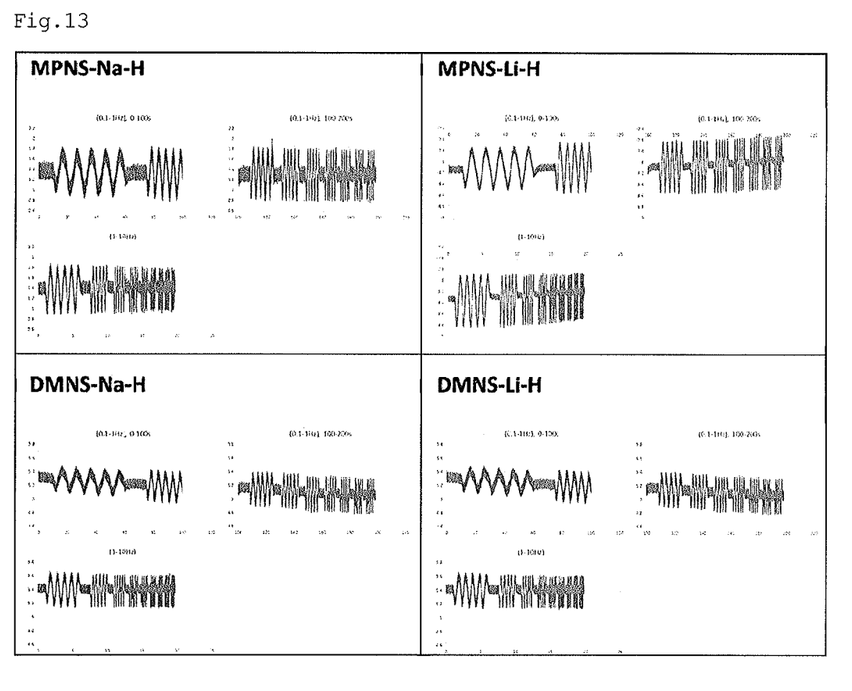
FIG. 13: Results of measurement of the deformation amount of a deformation sensor of the present invention.

FIG. 13 and Table 1 show the measurement results for these gels (ion-conductive polymer layer).

TABLE 1

| Amplitude, applying 1 Hz to sensor | |
|---|---|
| MPNS-Na—H | 0.8 * 10^(−1) mV |
| MPNS-Li—H | 0.8 * 10^(−1) mV |
| DMNS-Na—H | 0.4 * 10^(−1) mV |
| DMNS-Li—H | 0.3 * 10^(−1) mV |

Example 6

Figure 14:
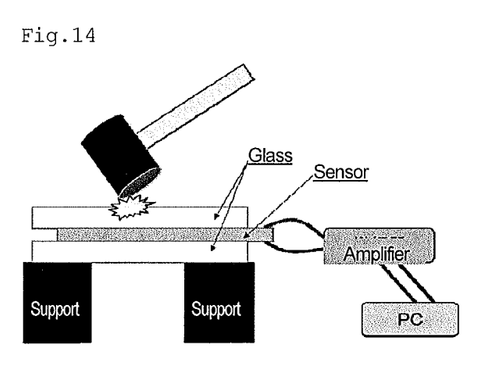
FIG. 14: A method for detecting the breakage of glass.
Figure 15:
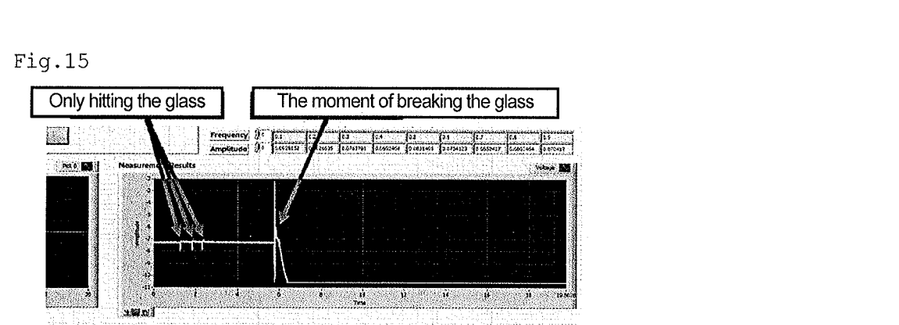
FIG. 15: Results of the detection of the breakage of glass.

As shown in FIG. 14, the deformation sensor obtained in Example 5 and glass were set. Using a hammer, impact was given three times with a strength that did not break the glass, and once with a strength that broke the glass. The results revealed that clearly distinct signals were obtained when the glass broke and when the glass did not break (FIG. 15).

REFERENCE NUMERALS

1: Deformation sensor
2: Holder
3: Plastic layer (PET film)
4: Conductive film (ITO film)
5: Plastic electrodes
6: Ion-conductive polymer (N117)
7: Double adhesive tape
8: Aluminum foil

The invention claimed is:

1. A deformation sensor comprising a structure in which an ion-conductive polymer layer is sandwiched between soft electrodes, wherein non-uniform ion distribution is generated in the ion-conductive polymer layer by deformation, thereby generating a potential difference between the electrodes,
wherein
each of the electrodes is a plastic electrode comprising a plastic layer and a conductive film,
the conductive film has a three-layer structure (ITO/Ag/ITO) or five-layer structure (ITO/Ag/ITO/Ag/ITO),
the ion-conductive polymer layer is sandwiched between the conductive films, and
the ion-conductive polymer is selected from the group consisting of ion-exchange resins having a fluororesin skeleton or a hydrocarbon resin skeleton, polymer complex gels, and copolymers of cationic monomers and anionic monomers.

2. The deformation sensor according to claim 1, wherein the conductive film is transparent.

3. The deformation sensor according to claim 1, wherein the conductive film has a surface resistance of 100Ω/Y or less and a vapor barrier property.

4. The deformation sensor according to claim 1, wherein the plastic electrodes are vapor-nonpermeable.

5. The deformation sensor according to claim 1, wherein the conductive film is transparent and has a surface resistance of 100Ω/Y or less and a vapor barrier property.

6. The deformation sensor according to claim 1, wherein the ion-conductive polymer is an ion-exchange resin having a fluororesin skeleton or a hydrocarbon resin skeleton.

7. The deformation sensor according to claim 1, wherein the ion-conductive polymer is a polymer complex gel.

8. The deformation sensor according to claim 1, wherein the ion-conductive polymer is a copolymer of a cationic monomer and an anionic monomer.

9. The deformation sensor according to claim 1, wherein the conductive film has a three-layer structure (ITO/Ag/ITO).

10. The deformation sensor according to claim 1, wherein the conductive film has a five-layer structure (ITO/Ag/ITO/Ag/ITO).

11. The deformation sensor according to claim 2, wherein the transparent conductive film has a three-layer structure (ITO/Ag/ITO).

12. The deformation sensor according to claim 2, wherein the transparent conductive film has a five-layer structure (ITO/Ag/ITO/Ag/ITO).

13. The deformation sensor according to claim 3, wherein the conductive film has a three-layer structure (ITO/Ag/ITO).

14. The deformation sensor according to claim 3, wherein the conductive film has a five-layer structure (ITO/Ag/ITO/Ag/ITO).

15. The deformation sensor according to claim 5, wherein the transparent conductive film has a three-layer structure (ITO/Ag/ITO).

16. The deformation sensor according to claim 5, wherein the transparent conductive film has a five-layer structure (ITO/Ag/ITO/Ag/ITO).

17. The deformation sensor according to claim 6, wherein the conductive film has a three-layer structure (ITO/Ag/ITO).

18. The deformation sensor according to claim 6, wherein the conductive film has a five-layer structure (ITO/Ag/ITO/Ag/ITO).

19. The deformation sensor according to claim 8, wherein the conductive film has a three-layer structure (ITO/Ag/ITO).

20. The deformation sensor according to claim 8, wherein the conductive film has a five-layer structure (ITO/Ag/ITO/Ag/ITO).

* * * * *